under 35 U.S.C. 154(b) by 0 days.

(12) United States Patent
Yamase et al.

(10) Patent No.: US 9,272,235 B2
(45) Date of Patent: Mar. 1, 2016

(54) FILTER APPARATUS

(75) Inventors: Norihide Yamase, Moriya (JP); Daisuke Oikawa, Abiko (JP)

(73) Assignee: SMC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/116,555

(22) PCT Filed: Jul. 21, 2011

(86) PCT No.: PCT/JP2011/067180
§ 371 (c)(1),
(2), (4) Date: Nov. 8, 2013

(87) PCT Pub. No.: WO2012/153431
PCT Pub. Date: Nov. 15, 2012

(65) Prior Publication Data
US 2014/0083299 A1    Mar. 27, 2014

(30) Foreign Application Priority Data

May 9, 2011    (JP) ................................ 2011-104627

(51) Int. Cl.
*B01D 46/00*    (2006.01)
*B01D 46/24*    (2006.01)
*B01D 46/42*    (2006.01)

(52) U.S. Cl.
CPC ........ *B01D 46/0004* (2013.01); *B01D 46/0005* (2013.01); *B01D 46/008* (2013.01);
(Continued)

(58) Field of Classification Search
CPC ........... B01D 46/0004; B01D 46/0005; B01D 46/0031; B01D 46/008; B01D 46/24; B01D 46/2411; B01D 46/4254
USPC ............................................. 95/416; 55/508
See application file for complete search history.

(56) References Cited

U.S. PATENT DOCUMENTS 2,925,883 A * 2/1960 Everett .......................... 96/360
3,182,750 A * 5/1965 Gleason et al. .............. 184/55.2
(Continued)

FOREIGN PATENT DOCUMENTS

CA    2 745 560 A1    6/2010
CN    101056686 A    10/2007
(Continued)

OTHER PUBLICATIONS

Espacenet Translation of WO 2010070102, Translated Jan. 8, 2015, All pages.*

(Continued)

*Primary Examiner* — Amber R Orlando
*Assistant Examiner* — Britanny Precht
(74) *Attorney, Agent, or Firm* — Oblon, McClelland, Maier & Neustadt, L.L.P.

(57) ABSTRACT

A filter apparatus is equipped with a first body, a case unit connected to a lower part of the first body, and a filter unit, which is accommodated in the interior of the case unit. The case unit is made up from an outer case, which is formed as a bottomed cylinder from a light-permeable transparent material, and an inner case that is inserted into the interior of the outer case. The case unit is inserted into an installation hole that opens on the lower part of the first body, and by rotation thereof, projections and retaining walls provided on an outer circumferential surface of the case unit are made to engage with support members provided in the installation hole, to thereby result in a connected state.

4 Claims, 13 Drawing Sheets

(52) U.S. Cl.
CPC ............ *B01D46/0031* (2013.01); *B01D 46/24* (2013.01); *B01D 46/2411* (2013.01); *B01D 46/4254* (2013.01)

(56) References Cited

U.S. PATENT DOCUMENTS

| | | | | |
|---|---|---|---|---|
| 3,214,054 | A * | 10/1965 | Poethig et al. | 220/240 |
| 3,507,098 | A * | 4/1970 | Veres et al. | 96/409 |
| 3,578,407 | A * | 5/1971 | Arnold et al. | 422/310 |
| 4,215,790 | A * | 8/1980 | Ribble et al. | 220/240 |
| 4,234,014 | A * | 11/1980 | Knight | 137/557 |
| 4,333,580 | A * | 6/1982 | Sweigart, Jr. | 220/4.13 |
| 4,707,168 | A * | 11/1987 | Mizutani | 96/416 |
| 4,735,288 | A * | 4/1988 | Uematsu et al. | 184/55.1 |
| 4,774,853 | A | 10/1988 | Takahashi | |
| 4,822,387 | A * | 4/1989 | Daniels | 55/323 |
| 5,122,167 | A * | 6/1992 | Daniels | 95/273 |
| 5,277,157 | A * | 1/1994 | Teich | 123/198 E |
| 5,676,273 | A * | 10/1997 | Jonkers et al. | 220/293 |
| 5,755,842 | A * | 5/1998 | Patel et al. | 55/330 |
| 5,876,600 | A * | 3/1999 | Matsubara et al. | 210/443 |
| 6,039,778 | A * | 3/2000 | Coulonvaux | 55/498 |
| 6,391,197 | B1 * | 5/2002 | Billiet | 210/232 |
| 6,402,798 | B1 * | 6/2002 | Kallsen et al. | 55/385.3 |
| 6,436,162 | B1 * | 8/2002 | Wake et al. | 55/498 |
| 6,709,474 | B2 * | 3/2004 | Zaffetti et al. | 55/320 |
| 6,818,045 | B2 * | 11/2004 | Welker | 96/11 |
| 7,025,385 | B2 * | 4/2006 | Drescher | 285/91 |
| 7,442,222 | B2 * | 10/2008 | Dworatzek et al. | 55/503 |
| 7,850,756 | B1 * | 12/2010 | Senetar, III | 55/503 |
| 7,976,603 | B2 * | 7/2011 | Bauder et al. | 55/503 |
| 8,512,563 | B2 * | 8/2013 | Hirsch et al. | 210/248 |
| 2005/0081497 | A1 * | 4/2005 | Connor et al. | 55/493 |
| 2005/0229785 | A1 | 10/2005 | Jachmann et al. | |
| 2005/0235620 | A1 * | 10/2005 | Connor et al. | 55/498 |
| 2006/0016769 | A1 * | 1/2006 | Hacker et al. | 210/791 |
| 2006/0086075 | A1 * | 4/2006 | Scott et al. | 55/498 |
| 2007/0066215 | A1 * | 3/2007 | Song et al. | 454/329 |
| 2007/0209341 | A1 | 9/2007 | Pearson et al. | |
| 2009/0229231 | A1 * | 9/2009 | Treyz | 55/504 |
| 2010/0224065 | A1 * | 9/2010 | Clarke et al. | 95/282 |
| 2011/0296999 | A1 | 12/2011 | Foerster et al. | |
| 2013/0055693 | A1 * | 3/2013 | Clarke et al. | 55/422 |

FOREIGN PATENT DOCUMENTS

| | | |
|---|---|---|
| DE | 30 18 158 A1 | 11/1980 |
| DE | 202004005983 | 7/2004 |
| DE | 20 2007 011389 | 11/2007 |
| JP | 05 009618 | 2/1993 |
| JP | 5-51411 U | 7/1993 |
| JP | 11-267434 A | 10/1999 |
| JP | 2005-211886 A | 8/2005 |
| JP | 2008 188489 | 8/2008 |
| JP | 2010-172821 A | 8/2010 |
| KR | 10-2004-0107508 A | 12/2004 |
| TW | 202751 | 3/1993 |
| WO | 2010 070102 | 6/2010 |

OTHER PUBLICATIONS

Combined Office Action and Search Report issued Jul. 31, 2014, in Chinese Patent Application No. 201180070746.4 with English translation.
U.S. Appl. No. 14/116,647, filed Nov. 8, 2013, Yamase, et al.
International search Report Issued Nov. 28, 2011 in PCT/JP11/067180 Filed Jul. 21, 2011.
Written opinion of the International Searching Authority Issued Nov. 28, 2011 in PCT/JP11/067180 Filed Jul. 21, 2011.
Office Action issued on Feb. 3, 2015 in Japanese Patent Application No. 2011-104627 with partial English translation.
Notice of Allowance issued May 7, 2015 in Japanese Patent Application No. 2011-104627 (with partial English language translation).
Office Action issued Sep. 4, 2015 in German Patent Application No. 11 2011 105 229.4.
Korean Office Action issued Sep. 18, 2015 in Patent Application No. 10-2013-7029328 (with Partial English Translation).
Korean Office Action issued Sep. 23, 2015 in Patent Application No. 10-2013-7029329 (with Partial English Translation).

* cited by examiner

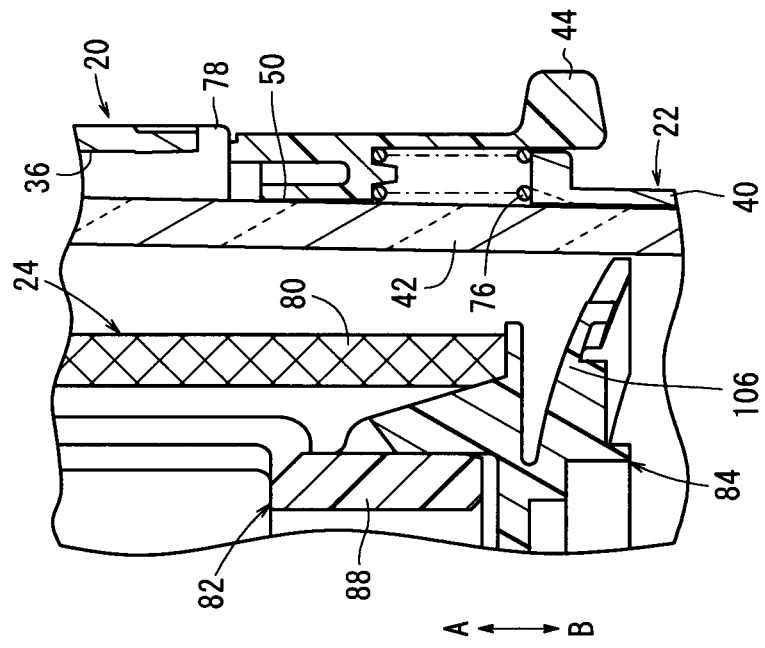
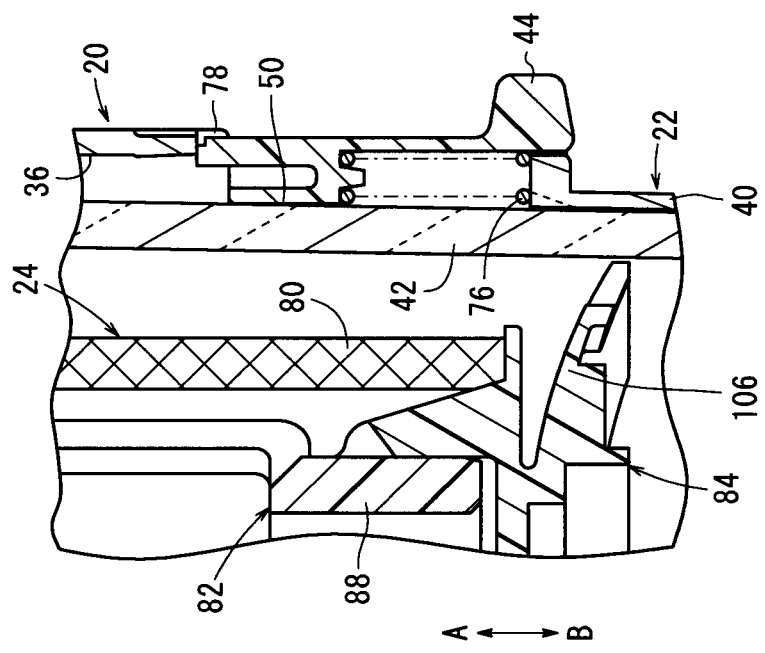

FILTER APPARATUS

TECHNICAL FIELD

The present invention relates to a filter apparatus for removing dust, particulates and the like contained in a fluid.

BACKGROUND ART

Heretofore, a filter apparatus has been known for removing dust, particulates and the like contained within a pressure fluid that is supplied to fluid pressure devices. For example, as disclosed in Japanese Laid-Open Patent Publication No. 2008-188489, such a filter apparatus is constituted from a fluid inlet port provided on an upstream side of a fluid pressure device supplied with the pressure fluid, and to which the pressure fluid is supplied, a main body having a fluid outlet port through which the pressure fluid is discharged, a filter element connected to a lower portion of the main body, and a case, which is connected to a lower portion of the main body so as to cover the filter element.

In addition, the pressure fluid, which is supplied to the fluid inlet port, is introduced to the interior of the case and passes from an outer circumferential side to an inner circumferential side of the filter element, whereby dust, particulates and the like contained within the pressure fluid are removed. A clean pressure fluid flows to the fluid outlet port from the inner circumferential side of the filter element, and thereafter the clean pressure fluid is supplied to other downstream fluid pressure devices.

SUMMARY OF INVENTION

The filter apparatus discussed above is installed, for example, on an assembly line or the like of a factory, wherein the fluid inlet port and the fluid outlet port thereof are connected respectively to tubes. Further, with such a filter apparatus, because the filter element tends to become clogged due to an increase in the amount of dust, particulates and the like that adhere with respect to the filter element, periodic maintenance operations must be carried out to replace the filter element, or to remove dust, particulates and the like therefrom.

Notwithstanding, because the filter element is connected to the main body, in the case that such maintenance operations are carried out, the filter element must be taken out from the main body after the case has been detached from the main body, and attachment and removal operations of the filter element are troublesome. Further, because tubes are connected respectively to the fluid inlet port and the fluid outlet port of the main body, dismantling of the main body is complicated, and in the event that the installation location of the main body is at a high position or a low position, operations for removal of the filter element from the main body are extremely difficult.

Furthermore, the filter element is disposed to project with respect to the main body, and the case is provided so as to cover the exterior side of the filter element. Consequently, if the case is dismounted with the aim of replacing the filter element, since the filter apparatus has a structure to enable free movement of the case only after an opened end of the case has been moved in an axial direction to the end of the filter element, operations for removal and attachment of the case tend to be quite cumbersome.

A general object of the present invention is to provide a filter apparatus, which enables attachment and removal of a filter to be carried out easily and reliably, irrespective of the installation location of the filter apparatus.

The present invention is a filter apparatus, comprising:
a body having ports through which a pressure fluid is supplied and discharged;
a case in a shape of a bottomed cylinder, which is attachable and detachable with respect to the body, and wherein an interior of the case communicates with the ports;
a filter unit accommodated in the interior of the case, the filter unit having a filter element for removing dust, particulates and the like contained within the pressure fluid, and a holder for retaining the filter element; and
a connecting mechanism for connecting the case and the filter unit, and for regulating mutual relative displacement in an axial direction between the case and the filter unit.

According to the present invention, the filter unit including the filter element is accommodated in a case that constitutes the filter apparatus, whereby the case and the filter unit are connected by means of a connecting mechanism such that mutual relative displacement between the case and the filter unit is regulated. Further, the case in which the filter unit is accommodated is detachable with respect to the body.

Accordingly, in a state in which the filter unit is accommodated in the interior of the case, because the case and the filter unit can be connected easily and reliably by the connecting mechanism while mutual axial displacement therebetween is regulated, for example, by attaching or detaching the case with respect to the body, simultaneously therewith, the filter unit can be attached or detached with respect to the body. As a result, compared to a filter apparatus according to the conventional technique in which the filter element is connected to the body, attachment and detachment operations are extremely easy to perform. For example, even in the case that the filter apparatus is installed at a high location, simply by detaching the case, operations for exchanging or replacing the filter unit can be performed at the same time, and thus, maintenance operations are easy to perform. Further, because the filter unit is accommodated in the interior of the case, in comparison with the conventional filter apparatus, if the case is either removed from or attached to the body, the movement amount thereof in the axial direction is extremely small, and thus such attachment and detachment operations are easy to perform, and are suited to being carried out in a narrow space or the like.

The above and other objects, features, and advantages of the present invention will become more apparent from the following description when taken in conjunction with the accompanying drawings in which preferred embodiments of the present invention are shown by way of illustrative example.

BRIEF DESCRIPTION OF DRAWINGS

FIG. 8A is a cross sectional view taken along line VIIIA-VIIIA of FIG. 2;

FIG. 8B is a cross sectional view showing a condition in which a release button in FIG. 8A is lowered and a rotation regulated state between a first body and a case unit is released;

DESCRIPTION OF EMBODIMENTS

Figure 1:
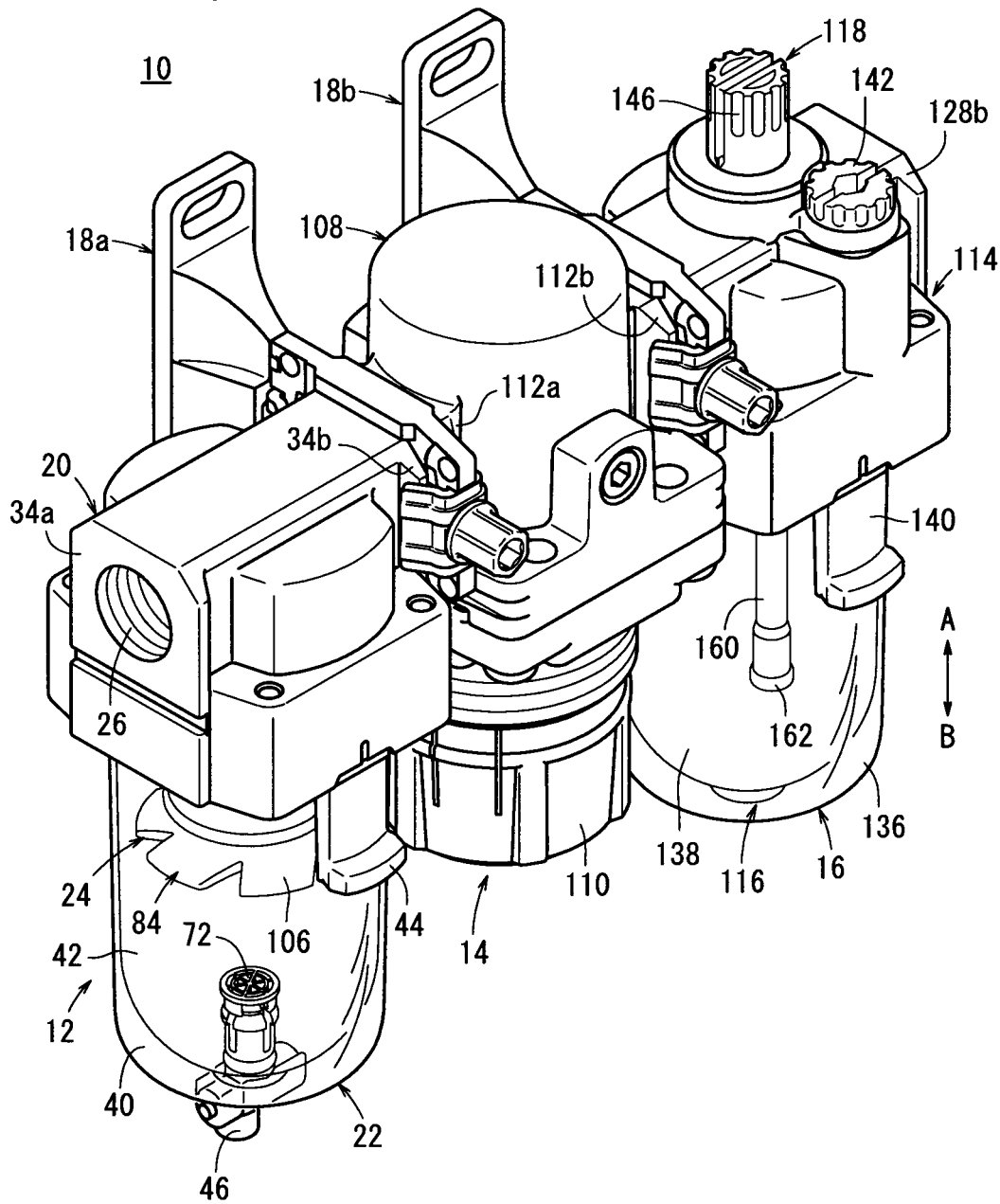
FIG. 1 is an exterior perspective view of a fluid pressure unit including a filter apparatus according to a first embodiment of the present invention.

In FIG. 1, reference numeral 10 indicates a fluid pressure unit including a filter apparatus according to the first embodiment of the present invention.

Figure 2:
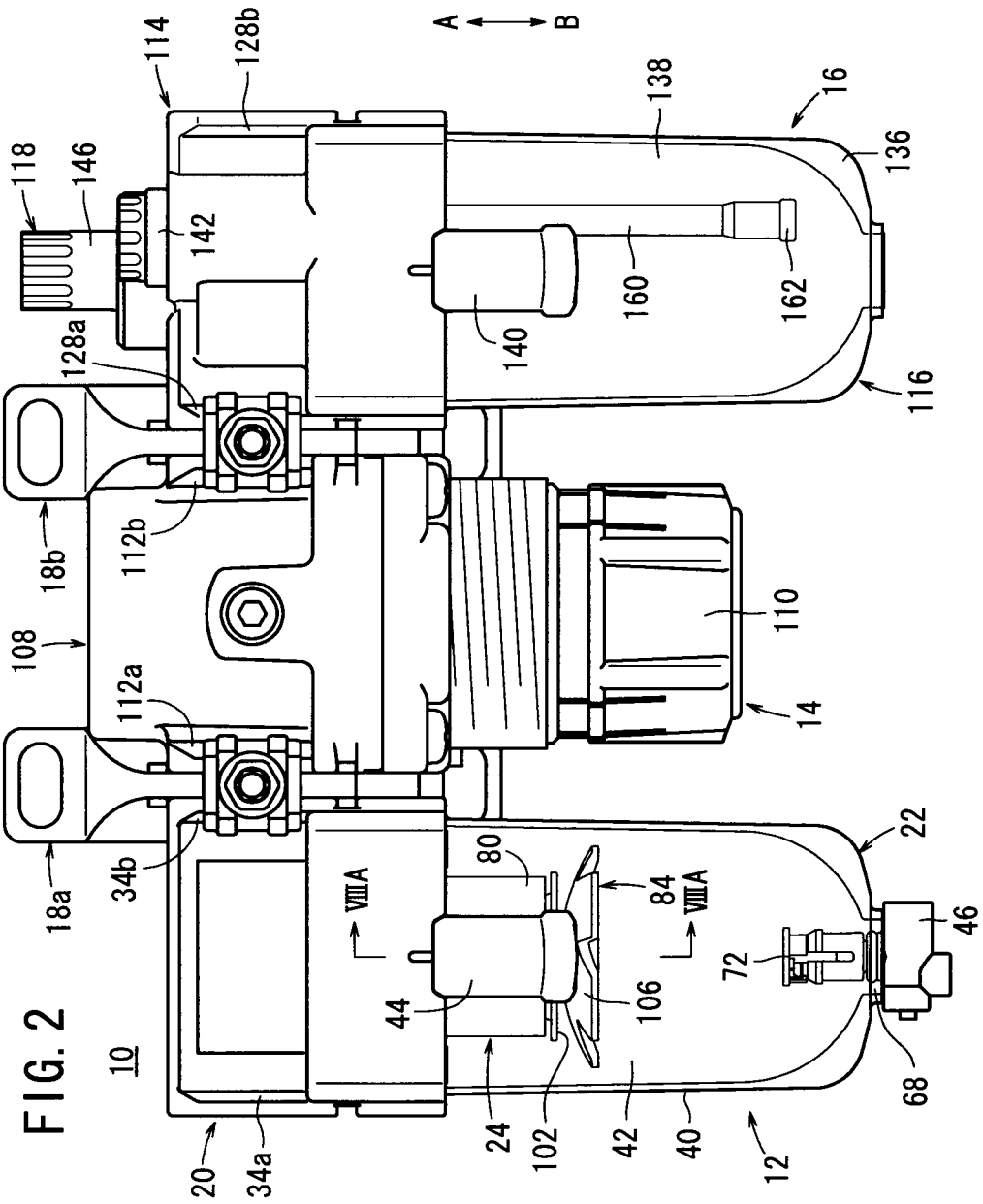
FIG. 2 is a front view of the fluid pressure unit shown in FIG. 1.

As shown in FIGS. 1 and 2, the fluid pressure unit 10 is made up from a filter apparatus 12 that removes dust, particulates and the like contained within the pressure fluid, a regulator 14 that reduces the pressure of the pressure fluid, a lubricator 16 that mixes a lubricating oil with respect to the pressure fluid, and connectors 18a, 18b that connect the filter apparatus 12, the regulator 14, and the lubricator 16 together mutually.

The aforementioned filter apparatus 12, the regulator 14, and the lubricator 16 function as fluid pressure devices to which a pressure fluid is supplied to the interiors thereof. The regulator 14 is disposed between the filter apparatus 12 and the lubricator 16.

As shown in FIGS. 1 to 7, the filter apparatus 12 includes a first body (body) 20, a case unit (case) 22 connected to a lower part of the first body 20, and a filter unit 24 that is installed in the interior of the case unit 22.

Figure 4:
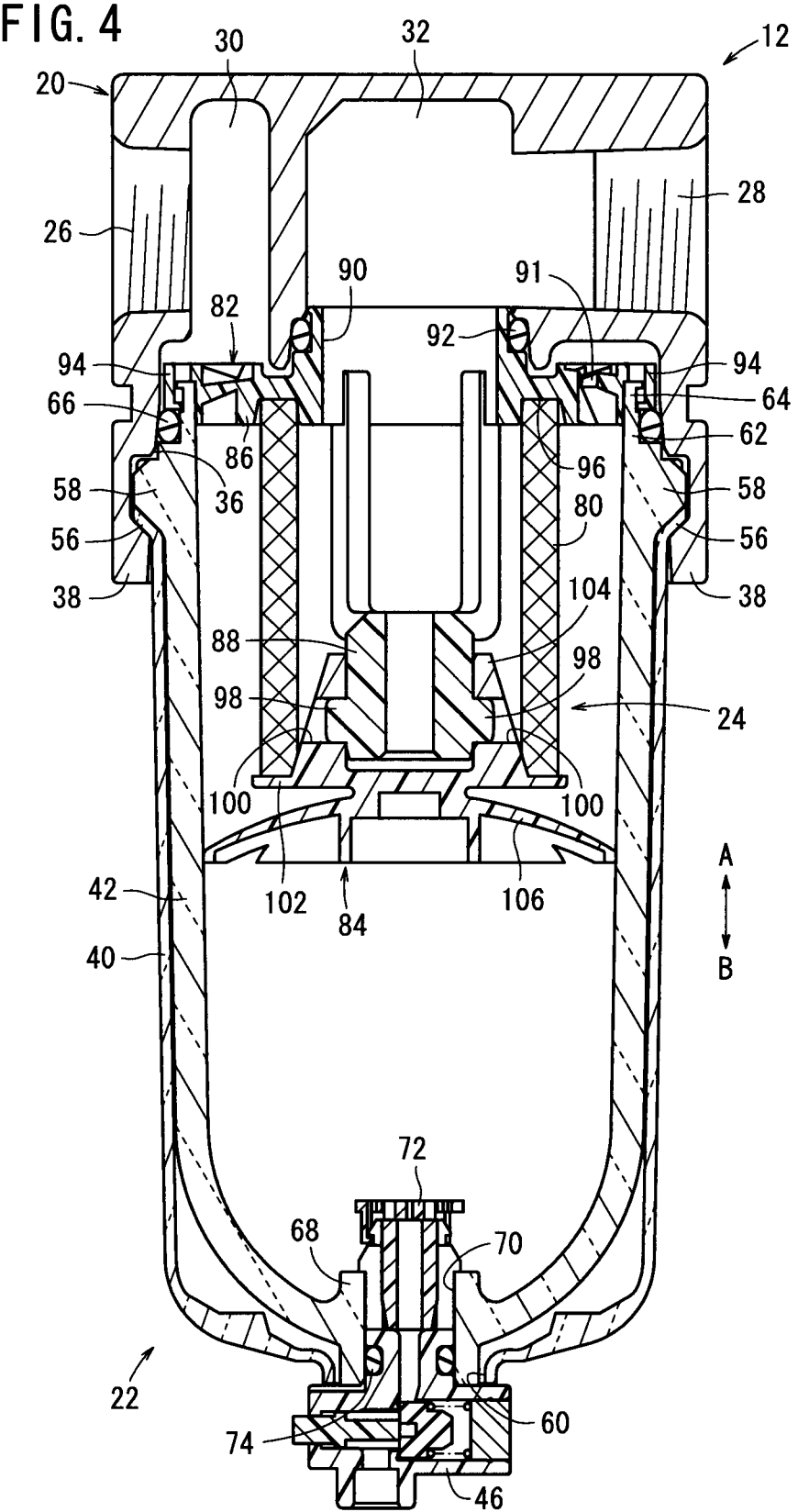
FIG. 4 is an overall cross sectional view of the filter apparatus shown in FIG. 3.

First and second ports (ports) 26, 28 for supply and discharge of a pressure fluid are provided laterally, i.e., on respective sides, of the first body 20, the first and second ports 26, 28 opening roughly in a horizontal direction (see FIG. 4). The first port 26 is connected to a non-illustrated tube, and the pressure fluid is supplied through such a tube. The first port 26 communicates with a first communication passage 30 that extends in the axial direction (the direction of arrows A and B) through the interior of the first body 20.

The second port 28 discharges the pressure fluid supplied through the first port 26 into a later-described regulator 14. The second port 28 communicates with a second communication passage 32 that extends in the axial direction (the direction of arrows A and B) through the interior of the first body 20.

Further, pairs of engagement projections 34a, 34b, which are each formed in a mutual confronting relation on outer edges of end surfaces on which the first and second ports 26, 28 are provided, are disposed on side surfaces of the first body 20.

An installation hole 36 into which the case unit 22 is inserted opens on a lower part of the first body 20. The first communication passage 30 communicates with an outer circumferential side of the installation hole 36, which is formed with a roughly circular shape in cross section, whereas the second communication passage 32 communicates with a central portion of the installation hole 36.

Figure 3:
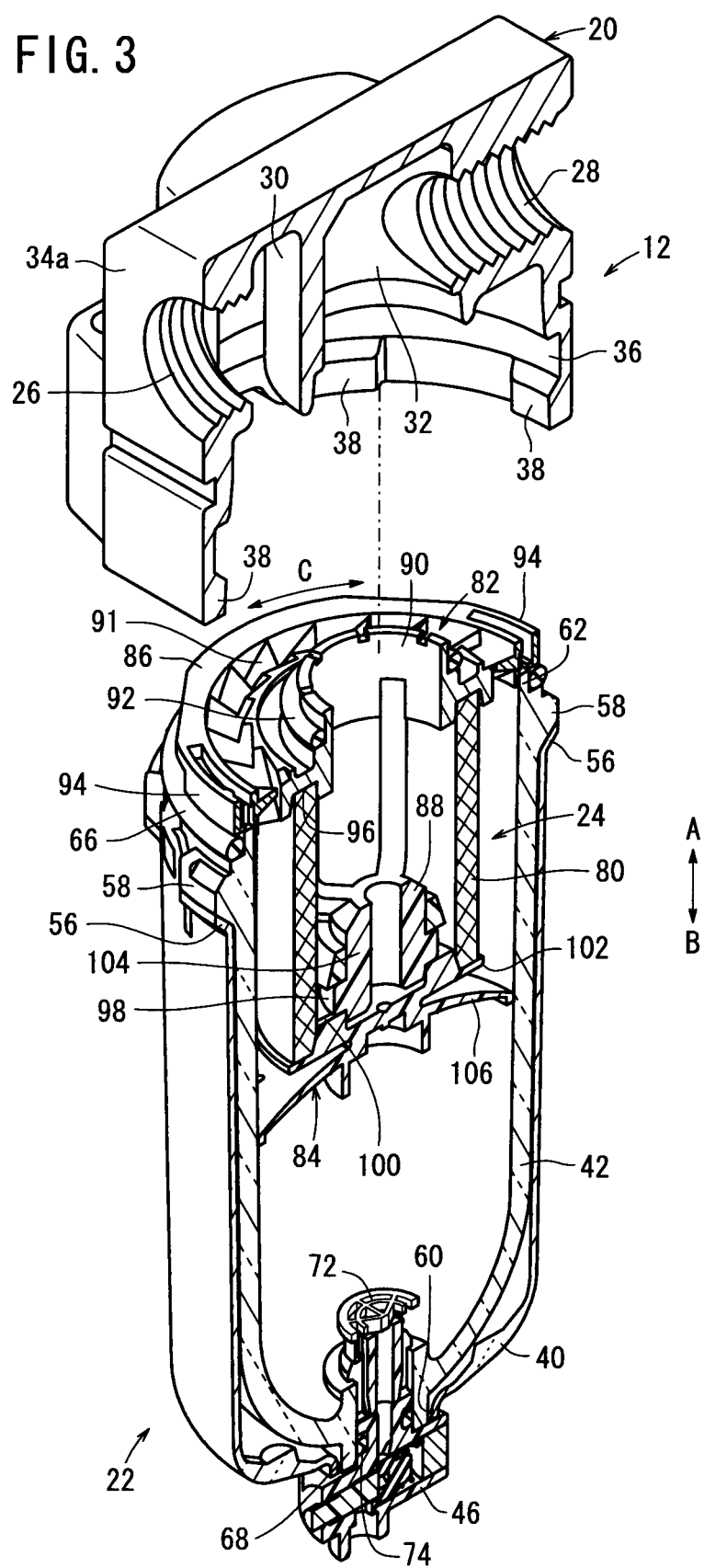
FIG. 3 is an exploded sectional perspective view of the filter apparatus of FIG. 1.

As shown in FIGS. 3 and 4, a plurality of support members 38, which project radially inward, are formed on the inner circumferential surface of the installation hole 36. Projections 58 of an inner case (second case portion) 42 that constitutes the case unit 22, and retaining walls 56 are engaged with the support members 38. The support members 38 are separated by equal intervals mutually along the circumferential direction of the installation hole 36.

The case unit 22 includes an outer case 40 formed as a bottomed cylinder, the inner case 42 that is inserted into an interior of the outer case 40, a release button 44 disposed for displacement with respect to the outer case 40, and a drain cock 46 disposed on bottom parts of the outer case 40 and the inner case 42.

The outer case 40 is formed with a substantially constant diameter and a predetermined length in the axial direction (the direction of arrows A and B) from a light-permeable transparent resin material (acrylic, polycarbonate, etc.). A bottom portion of the outer case 40 is formed in a hemispherical shape, and the upper end of the outer case 40 opens upwardly.

A pair of connecting tongues 48a, 48b (see FIG. 6) that project upwardly (in the direction of the arrow A) in the axial direction are formed on an upper portion of the outer case 40, and a button hole 50 in which the later-described release button 44 is mounted is formed at a position located between one of the connecting tongues 48a and the other of the connecting tongues 48b. The connecting tongues 48a, 48b are capable of being deformed in radial directions of the outer case 40. Holes 54, with which respective projections 52 of the inner case 42 are engageable, are disposed in roughly central portions of the connecting tongues 48a, 48b. The holes 54 open in roughly rectangular shapes.

Further, the button hole 50, which is formed as a roughly rectangular cutout, extends in the axial direction downwardly (in the direction of the arrow B) from the upper edge of the outer case 40.

Furthermore, a plurality of retaining walls 56, which gradually expand in diameter in a radially outward direction, are formed on an upper portion of the outer case 40. The retaining walls 56 are separated mutually by substantially equal intervals along the circumferential direction of the outer case 40, such that the projections 58 are capable of being retained by the retaining walls 56 if the inner case 42 is accommodated inside the outer case 40.

On the other hand, a boss hole 60, into which a drain boss 68 (described later) of the inner case 42 is inserted, is formed in a substantially central location along the axis on a bottom part of the outer case 40.

The inner case 42, similar to the outer case 40, is formed with a substantially constant diameter, for example, from a light-permeable transparent resin material (polycarbonate or the like) and extends a predetermined length along the axial direction (the direction of arrows A and B). A bottom portion of the inner case 42 is formed in a hemispherical shape, and the upper end thereof opens upwardly. The outer diameter of the inner case 42 is equal to or set slightly smaller than the inner diameter of the outer case 40 (see FIG. 4).

Further, a plurality of projections 58, which project radially outward from the outer circumferential surface thereof, are formed on an upper portion of the inner case 42, the projections 58 being disposed at substantially equal intervals mutually along the circumferential direction of the inner case 42. The numbers of projections 58 and retaining walls 56 are set at the same numbers as the support members 38 of the first body 20, and the interval between the adjacent projections 58 and retaining walls 56 is set to be the same as the interval between the adjacent support members 38.

Inclined surfaces, which are tilted upwardly, are provided on lower portions of the projections 58, whereas the projections 58 have flat shapes extending substantially horizontally on upper surfaces of the projections 58. In addition, if the inner case 42 is accommodated inside the outer case 40, the inclined surfaces of the projections are retained in abutment respectively against the retaining walls 56.

Further, between two adjacent projections 58, a pair of projections 52 are provided, which project outwardly at a predetermined height with respect to the outer circumferential surface of the inner case 42, such that on an occasion where the inner case 42 is assembled with respect to the outer case 40, the projections 52, which are formed with substantially rectangular shapes in cross section, engage with the holes 54 of the connecting tongues 48a, 48b. Owing thereto, the outer case 40 and the inner case 42 are connected together strongly by the pair of connecting tongues 48a, 48b.

Furthermore, an annular wall 62, which is reduced in diameter in a radially inward direction with respect to the outer circumferential surface of the inner case 42, is formed on an upper part of the inner case 42. A plurality of hooks (first engagement members) 64, which project outwardly from the upper part thereof, are disposed on the annular wall 62, and together therewith, a first sealing ring 66 made up from an elastic material is installed on an outer circumferential side of the annular wall 62. The hooks 64 are spaced at equal intervals mutually along the circumferential direction of the inner case 42, upper ends of the hooks 64 projecting in radially outward directions. Stated otherwise, the upper ends of the hooks 64 are L-shaped in cross section and project radially outward.

A deflector (holder) 82 (described later), which constitutes part of the filter unit 24, is retained by the hooks 64 if the filter unit 24 is accommodated in the interior of the case unit 22 including the inner case 42.

On the other hand, a drain boss 68, which projects in the axial direction (the direction of arrows A and B) at a substantially central portion on the axis, is formed on the bottom part of the inner case 42. A drain hole 70 in which the drain cock 46 is inserted is formed in the interior of the drain boss 68.

In addition, on an occasion where the inner case 42 is assembled with respect to the outer case 40, after the drain boss 68 of the inner case 42 has been inserted into the boss hole 60 of the outer case 40, the drain cock 46 is inserted (e.g., lightly press-fitted) into the drain hole 70, and fixed from the interior of the inner case 42 by a fixing plug 72.

A second sealing ring 74 made of an elastic material is mounted via an annular groove on an outer circumferential surface of the drain cock 46, such that upon insertion of the second sealing ring 74 into the drain hole 70, and by abutment thereof against the inner circumferential surface of the drain hole 70, leakage of pressure fluid between the drain cock 46 and the drain hole 70 is prevented.

The release button 44 is made up from a block that is L-shaped in cross section, which is installed in the button hole 50, such that a projecting region thereof is positioned on an outer side of the outer case 40 and a lower side of the release button 44 (in the direction of the arrow B). The release button 44 is disposed for displacement in upward and downward directions (the directions of arrows A and B) along the button hole 50, with a spring 76 being interposed between the release button 44 and a lower end surface of the button hole 50. Thus, the release button 44 is normally in a state of being biased upwardly on the outer case 40 (in the direction of the arrow A).

Additionally, if the case unit 22 is installed with respect to the installation hole 36 of the first body 20, the upper end of the release button 44 is inserted into a recess 78 (see FIG. 8A) that is formed in the installation hole 36 of the first body 20. Owing thereto, displacement in a rotational direction of the case unit 22 with respect to the first body 20 is regulated.

Stated otherwise, the release button 44 functions as a stopper member for regulating rotational displacement of the case unit 22, in a state in which the case unit 22 is connected with respect to the first body 20.

As shown in FIGS. 3 through 5 and 7, the filter unit 24 includes a cylindrical shaped filter element 80, the deflector 82 that retains the filter element 80, and a baffle 84 that is installed on an end of the deflector 82. The filter element 80 is formed as a cylinder on which fibers of, for example, polypropylene, polyethylene or the like, are wound having a predetermined thickness in the radial direction.

The deflector 82 is equipped with a disk-shaped main body 86, and a retaining member 88 formed on a lower part of the main body 86 and which is capable of retaining the baffle 84. A through hole 90 penetrates through a substantially central part of the main body 86, and multiple fins 91 are formed on the outer circumferential side of the through hole 90. The fins 91 are separated at equal intervals mutually along the circumferential direction of the deflector 82, and are formed so as to be inclined at a predetermined angle with respect to the axial direction of the deflector 82.

Further, a third sealing ring 92 made of an elastic material is mounted on an outer circumferential side of the through hole 90 in the main body 86. The third sealing ring 92 abuts against an inner circumferential surface of the second communication passage 32, under a condition in which the filter unit 24 is installed in the first body 20 together with the case unit 22. Owing thereto, leakage of pressure fluid between the filter unit 24 and the second communication passage 32 is prevented.

Further, plural (e.g., four) guide walls (second engagement members) 94 are formed on the main body 86, which project downwardly (in the direction of the arrow B) on an outer edge portion that defines the outer circumferential side of the fins 91. The guide walls 94 are separated at equal intervals mutually along the circumferential direction of the main body 86, and are separated a predetermined interval in the radial direction with respect to the outer edge portion. Further, the lower ends of the guide walls 94 are L-shaped in cross section, and are folded in a radial inward direction.

Additionally, if the filter unit 24 is assembled with respect to the case unit 22, the hooks 64 of the inner case 42 are inserted into the inner circumferential sides of the guide walls 94, whereby the lower ends of the guide walls 94 and the upper ends of the hooks 64 overlap one another in the radial direction (see FIG. 4). Owing thereto, displacement in the axial direction (the direction of arrows A and B) of the inner case 42 and the filter unit 24 including the deflector 82 is regulated. Consequently, the filter unit 24 is connected in a state of being accommodated in the interior of the case unit 22.

On the other hand, a filter groove 96 into which the upper end of the filter element 80 is inserted is formed in an annular shape on a lower surface of the main body 86.

The retaining member 88 is formed in a cylindrical shape and is connected with respect to the main body 86, together with being disposed at a predetermined interval from the main body 86 in the axial direction (the direction of the arrow B). In addition, a pair of pins 98 project from an outer circumferential side on the retaining member 88, and by insertion of the pins 98 into grooves 100 of the later-described baffle 84, the baffle 84 is connected with respect to the retaining member 88. Further, the cylindrically shaped filter element 80 is inserted over an outer circumferential side of the retaining member 88.

The baffle 84 includes a disk-shaped base 102, a connector 104 formed on an upper portion of the base 102 and connected to the retaining member 88 of the deflector 82, and a skirt 106 formed on a lower portion of the base 102. The base 102 is formed in a substantially planar shape, and a lower end surface of the filter element 80 abuts against and is retained by the upper surface of the base 102. The connector 104 is formed with a conical shape in cross section, tapering gradually in an upward direction. The pair of grooves 100 extends in a circumferential direction along a wall surface of the connector 104.

In addition, under a condition in which the retaining member 88 of the deflector 82 is inserted through the filter element 80, after the retaining member 88 has been inserted into the interior of the connector 104 and the pins 98 have been inserted respectively into the grooves 100, the retaining member 88 and the baffle 84 are rotated circumferentially a predetermined angle in mutually opposite directions. Consequently, the pins 98 are moved to the ends of the grooves 100 and become engaged therewith. As a result, relative displacement in the axial direction (the direction of arrows A and B) between the deflector 82 and the baffle 84 is regulated, and the baffle 84 is connected with respect to the retaining member 88 under a state in which the filter element 80 is retained between the deflector 82 and the baffle 84.

As shown in FIGS. 1 and 2, the regulator 14 comprises a second body 108, a handle 110 rotatably disposed on a lower part of the second body 108, and an adjustment mechanism (not shown), which is capable of adjusting the pressure fluid by operating the handle 110. A pair of ports (not shown) for supply and discharge of a pressure fluid are formed laterally, i.e. on respective sides, of the second body 108. One of the ports is connected to and communicates with the second port 28 of the filter apparatus 12 to which pressure fluid from the filter apparatus 12 is supplied, and the other of the ports is connected to and communicates with a third port 122 (described later) of the lubricator 16 through which the pressure fluid is discharged.

Further, pairs of engagement projections 112a, 112b are disposed on side surfaces of the second body 108, in mutual opposing relation on outer edges of end surfaces on which the pair of ports is provided. In a state in which the engagement projections 112a of the end surface that is connected with the second port 28 of the filter apparatus 12 abut against the engagement projections 34b of the adjacent filter apparatus 12, the engagement projections 34b, 112a are connected together mutually by installation of the connector 18a so as to cover outer sides of the engagement projections 34b, 112a. At this time, the second port 28 of the filter apparatus 12 and one of the ports on the regulator 14 are connected in a state of communication.

The regulator 14 is equipped with the pressure adjustment mechanism at the interior thereof. The pressure adjustment mechanism is operated by rotation of the handle 110, such that after the pressure of the pressure fluid supplied from the one port has been adjusted to a desired pressure, the pressure fluid is discharged from the other port and supplied to the lubricator 16.

The lubricator 16 is used with the aim of causing lubricating oil to be dripped into the pressure fluid, and which by using the flow of the pressure fluid, supplies the lubricating oil to slidable portions in other fluid pressure devices. As shown in FIGS. 1, 2, 9 and 10, the lubricator 16 includes a third body 114, a case unit 116 connected to a lower part of the third body 114, a dripping member 118 that is inserted into the interior of the third body 114, and a holder 120 for fixing the dripping member 118 with respect to the third body 114.

Third and fourth ports 122, 124 for supply and discharge of the pressure fluid are disposed laterally, i.e., on respective sides, of the third body 114. The third port 122 and the fourth port 124 communicate mutually through a third communication passage 126. The third port 122 is connected to another port in the regulator 14, which is disposed adjacent thereto, and the fourth port 124 is connected to an unillustrated tube.

Further, pairs of engagement projections 128a, 128b, which are each mutually opposed to one another on outer edges of end surfaces on which the third and fourth ports 122, 124 are provided, are disposed on side surfaces of the third body 114. Under a condition in which the engagement projections 128a on the end surface of the lubricator 16 facing the regulator 14 abut against the engagement projections 112b of the regulator 14, the engagement projections 112b, 128a are connected together mutually by installation of the connector 18b so as to cover outer sides of the engagement projections 112b, 128a. At this time, the third port 122 of the lubricator 16 is connected in a state of communication with the other port on the regulator 14.

Figure 9:
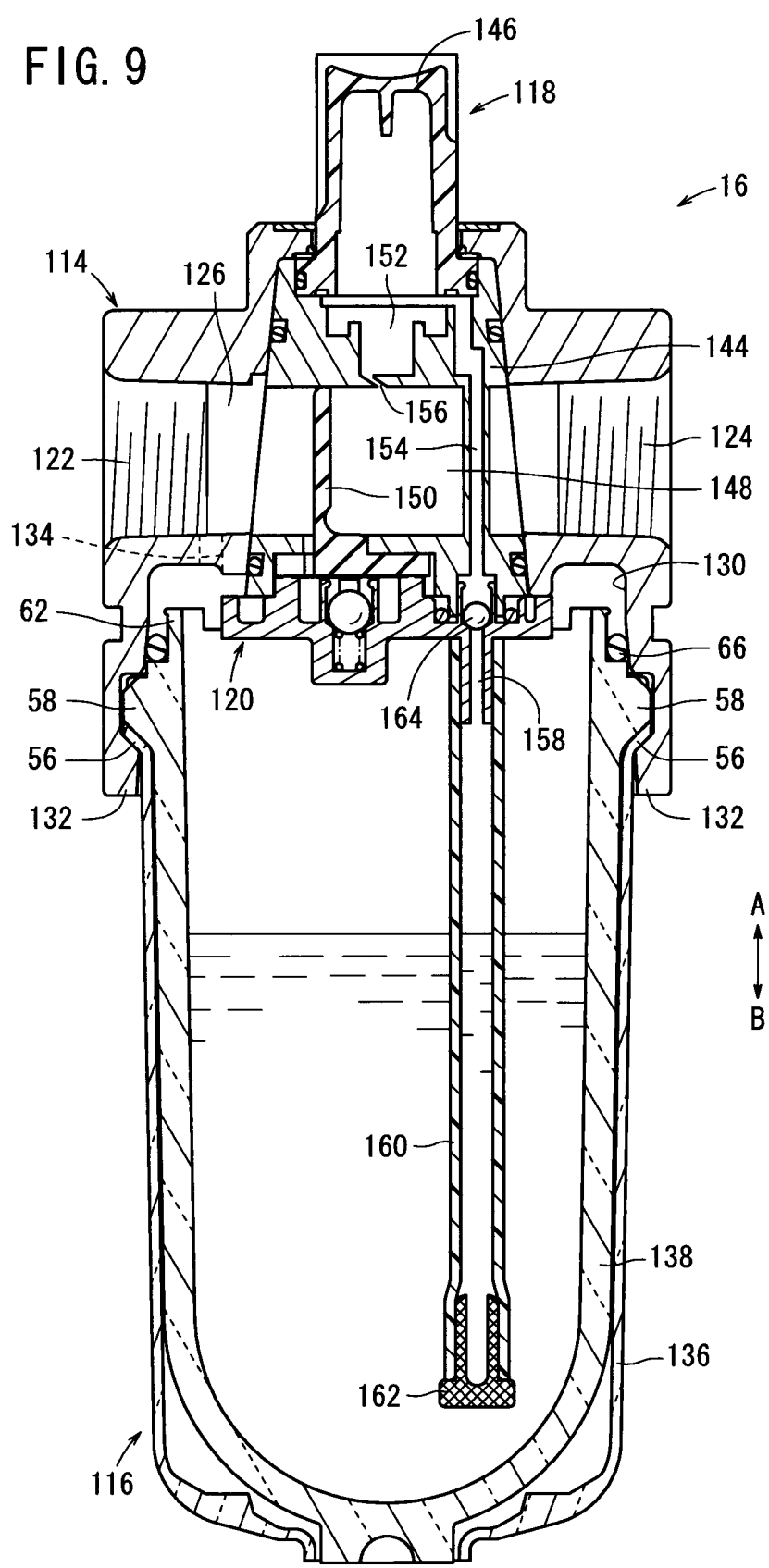
FIG. 9 is an overall cross sectional view of a lubricator that constitutes part of the fluid pressure unit of FIG. 1.
Figure 10:
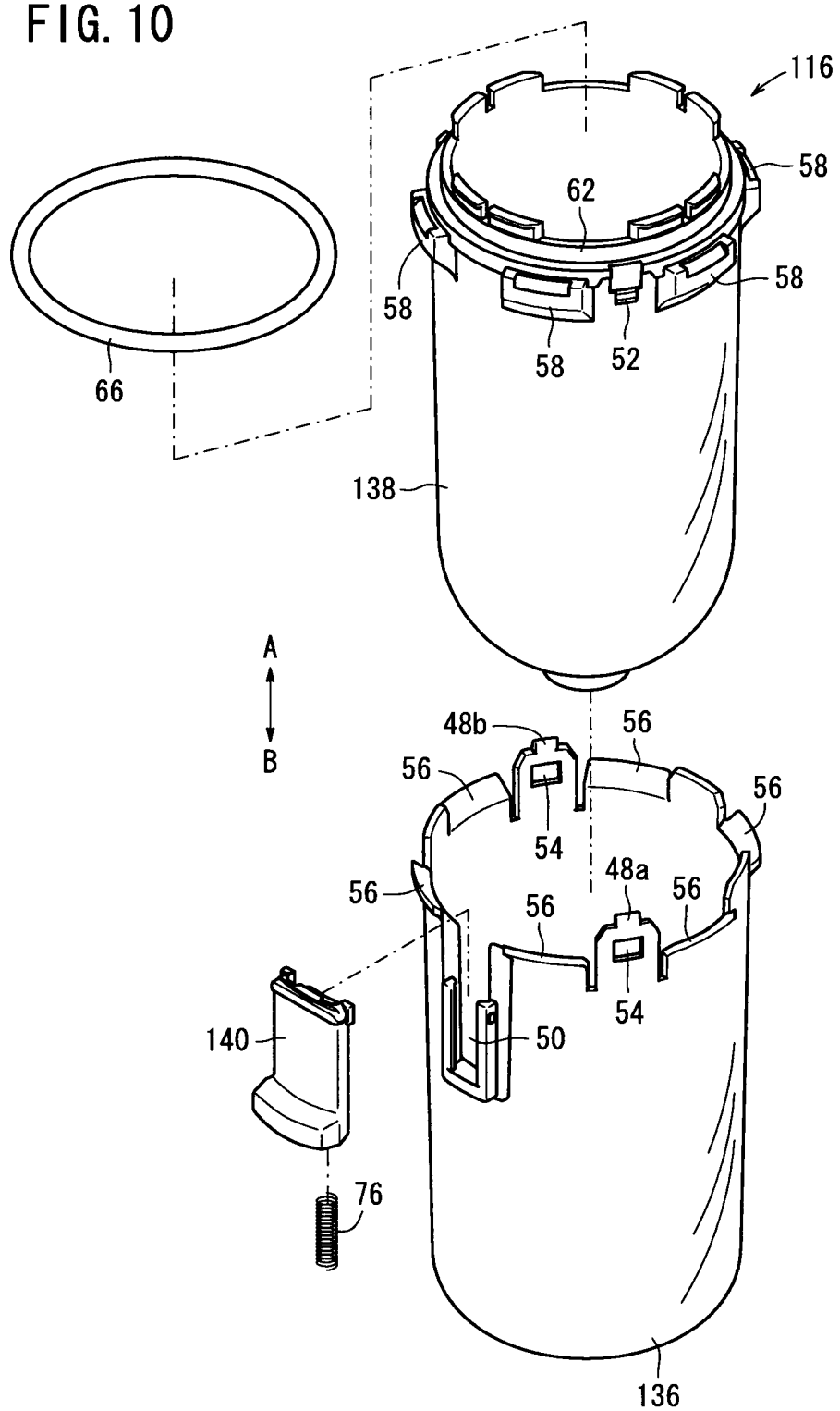
FIG. 10 is an exploded perspective view of a case unit that constitutes part of the lubricator of FIG. 1.

Furthermore, an installation hole 130 in which the case unit 116 is inserted opens on a lower part of the third body 114. As shown in FIG. 9, plural support members 132 that project radially inward are formed on an inner circumferential surface of the installation hole 130. Projections 58 of an inner case 138, and retaining walls 56 of an outer case 136 engage with the support members 132. The case unit 116 contains the inner case 138 and the outer case 136. The support members 132 are disposed so as to be separated by equal intervals mutually along the circumferential direction of the installation hole 130.

Further, a branch passage 134 that extends toward the side of the third port 122 (in the direction of the arrow A) is formed in the installation hole 130. A portion of the pressure fluid supplied to the third port 122 is supplied, via the branch passage 134, into the interior of the case unit 116 that is mounted in the installation hole 130.

The case unit 116 includes the outer case 136 formed as a bottomed cylinder, the inner case 138 inserted through the interior of the outer case 136, and a release button 140 that is displaceable with respect to the outer case 136.

Construction of the case unit 116 is roughly the same as that of the case unit 22 of the above-described filter apparatus 12. Thus, the same reference characters are applied to the same constituent elements thereof, and detailed descriptions of such features are omitted.

The outer case 136 is formed with a substantially constant diameter and a predetermined length in the axial direction from a light-permeable transparent resin material (acrylic, polycarbonate, etc.). A bottom portion of the outer case 136 is formed in a hemispherical shape, and the upper end of the outer case 136 opens upwardly. A pair of connecting tongues 48a, 48b that project upwardly (in the direction of the arrow A) in the axial direction are formed on an upper portion of the outer case 136, and a button hole 50 in which the later-described release button 140 is mounted is formed at a position located between one of the connecting tongues 48a and the other of the connecting tongues 48b.

Furthermore, a plurality of retaining walls 56, which gradually expand in diameter in a radially outward direction, are formed on an upper portion of the outer case 136. The retaining walls 56 are separated mutually by substantially equal intervals along the circumferential direction of the outer case 136, such that the projections 58 are capable of being retained by the retaining walls 56 if the inner case 138 is accommodated inside the outer case 136.

The inner case 138, similar to the outer case 136, is formed with a substantially constant diameter, for example, from a light-permeable transparent resin material (polycarbonate or the like) and extends a predetermined length in the axial direction. A bottom portion of the inner case 138 is formed in a hemispherical shape, and the upper end thereof opens upwardly. The interior of the inner case 138 is filled with lubricating oil through an oil supply plug 142 (see FIGS. 1 and 2), which is provided on the third body 114.

Further, a plurality of projections 58, which project radially outward from the outer circumferential surface thereof, are formed on an upper portion of the inner case 138, the projections 58 being disposed at substantially equal intervals mutually along the circumferential direction of the inner case 138. Inclined surfaces of the projections 58 come into abutment against and are retained respectively by the retaining walls 56 if the inner case 138 is accommodated inside the outer case 136.

Further, between two adjacent projections 58, a pair of projections 52 are provided, which project outwardly at a predetermined height with respect to the outer circumferential surface of the inner case 138. If the inner case 138 is assembled with respect to the outer case 136, the projections 52, which are formed with substantially rectangular shapes in cross section, engage within the holes 54 of the connecting tongues 48a, 48b. Owing thereto, the outer case 136 and the inner case 138 are connected together strongly.

Furthermore, an annular wall 62, which is reduced in diameter in a radially inward direction with respect to the outer circumferential surface of the inner case 138, is formed on an upper part of the inner case 138. A plurality of hooks 64, which project outwardly from the upper part thereof, are disposed on the annular wall 62, and together therewith, a first sealing ring 66 made up from an elastic material is installed on an outer circumferential side of the annular wall 62.

The release button 140 is made up from a block that is L-shaped in cross section, which is installed in the button hole 50, such that a projecting region thereof is positioned on an outer side of the outer case 136 and on a lower side of the release button 140 (in the direction of the arrow B). The release button 140 is disposed for displacement in upward and downward directions (the directions of arrows A and B) along the button hole 50, with a spring 76 being interposed between the release button 140 and a lower end surface of the button hole 50. Thus, the release button 140 is normally in a state of being biased upwardly on the outer case 136 (in the direction of the arrow A).

Additionally, if the case unit 116 is installed with respect to the installation hole 130 of the third body 114, the upper end of the release button 140 is inserted into a recess 78 that is formed in the installation hole 130 of the third body 114. Owing thereto, displacement in a rotational direction of the case unit 116 with respect to the third body 114 is regulated. Stated otherwise, the release button 140 functions as a stopper member for regulating rotational displacement of the case unit 116, in a state in which the case unit 116 is connected with respect to the third body 114.

As shown in FIG. 9, the dripping member 118 comprises an inner member 144 that is inserted in the interior of the third body 114, and a drip plug 146 that is provided on an upper portion of the inner member 144. The inner member 144 is inserted so as to penetrate through the third communication passage 126.

The inner member 144 includes a fourth communication passage 148 that penetrates therethrough horizontally. The fourth communication passage 148 is arranged on a straight line together with the third communication passage 126. More specifically, pressure fluid that is supplied to the third port 122 passes through the third and fourth communication passages 126, 148 and flows to the fourth port 124.

Further, a damper 150 made from an elastic material and which is disposed in an upstanding manner perpendicular to the direction of extension of the fourth communication passage 148 is disposed in the fourth communication passage 148. The damper 150 is disposed so as to be tiltable by a predetermined angle toward the side of the fourth port 124 corresponding to the flow amount of pressure fluid that is supplied from the third port 122.

A reservoir 152 through which lubricating oil is supplied from the inner case 138 is formed above the fourth communication passage 148 in the inner member 144. The reservoir 152 communicates with an oil passage 154 that extends downwardly, and lubricating oil is supplied through the oil passage 154. A drip opening 156 that communicates with the fourth communication passage 148 opens downwardly in a substantially central portion of the reservoir 152. The oil passage 154 is perpendicular with respect to the fourth communication passage 148, extends therethrough while being separated from the fourth communication passage 148, and communicates with an oil supply port 158 that is formed in the holder 120.

The holder 120 is installed on a lower portion of the inner member 144 that constitutes the dripping member 118, and retains a portion of the damper 150 interposed between the inner member 144 and the holder 120. The holder 120 comprises the oil supply port 158 which communicates with the oil passage 154. The oil supply port 158 projects downwardly (in the direction of the arrow B), and is arranged in the interior of the inner case 138. An oil guide tube 160 is connected to the oil supply port 158.

The oil guide tube 160 has a predetermined length along the axial direction (the direction of arrows A and B), and in a state of being connected to the oil supply port 158, extends to the vicinity of a bottom part of the inner case 138. Further, a removal filter 162 for removing debris or the like that may be contained within the lubricating oil is disposed on a lower end of the oil guide tube 160.

In addition, lubricating oil that fills the inner case 138, after passing through the oil guide tube 160 and flowing toward the side of the holder 120, passes through the oil passage 154 and is supplied into the reservoir 152. The lubricating oil passes through the drip opening 156 from the reservoir 152 and is dripped into the fourth communication passage 148. As a result, a predetermined amount of lubricating oil is mixed with the pressure fluid that flows through the fourth communication passage 148. A check valve 164 for preventing reverse flow of the lubricating oil toward a side of the inner case 138 from the oil passage 154 is disposed in the oil supply port 158.

The fluid pressure unit 10 including the filter apparatus 12, to which a case structure according to the first embodiment of the present invention is applied, is constructed basically as described above. Next, explanations shall be made concerning assembly of the filter apparatus 12 and the lubricator 16. First, assembly of the filter apparatus 12 shall be explained with reference to FIGS. 4 through 6. In the following explanations, it is assumed that the filter unit 24 is in a pre-assembled condition, i.e., in which the filter element 80, the deflector 82 and the baffle 84 already are assembled together (see FIG. 5).

First, the case unit 22 is assembled. In this case, in the condition shown in FIG. 6, the inner case 42 is inserted from above into the interior of the open outer case 40, and bottom portions thereof are placed in proximity, whereby the drain boss 68 is inserted into the boss hole 60. At the same time, the connecting tongues 48*a*, 48*b* of the outer case 40 are made to confront the projections 52 of the inner case 42, and the projections 52 are inserted into the holes 54. Consequently, the holes 54 of the connecting tongues 48*a*, 48*b* and the projections 52 become engaged, whereby the outer case 40 and the inner case 42 are connected together mutually such that the inner case 42 is accommodated inside the outer case 40.

On this occasion, the outer case 40 and the inner case 42 are connected such that relative displacement in both axial (the direction of arrows A and B) and circumferential directions is regulated.

Further, the retaining walls 56 of the outer case 40 abut respectively against lower end surfaces on the projections 58 of the inner case 42 (see FIG. 4).

In addition, after the drain cock 46 has been inserted from below with respect to the boss hole 60 of the outer case 40, the drain cock 46 is fixed by the fixing plug 72, and assembly of the case unit 22 is completed by installation of the first sealing ring 66 onto the outer circumferential side of the annular wall 62 of the inner case 42 (see FIGS. 3 and 5).

Figure 5:
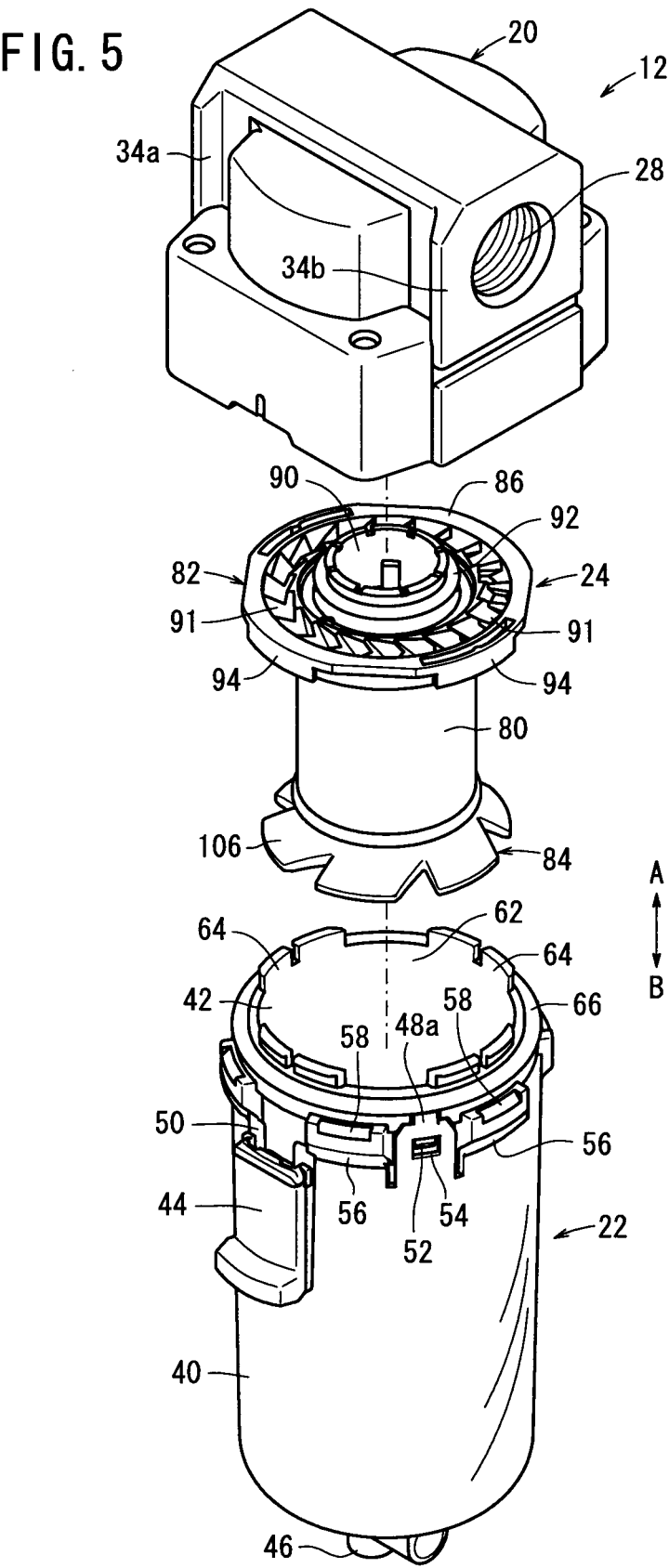
FIG. 5 is an exploded perspective view of a filter apparatus that constitutes part of the fluid pressure unit of FIG. 1.
Figure 6:
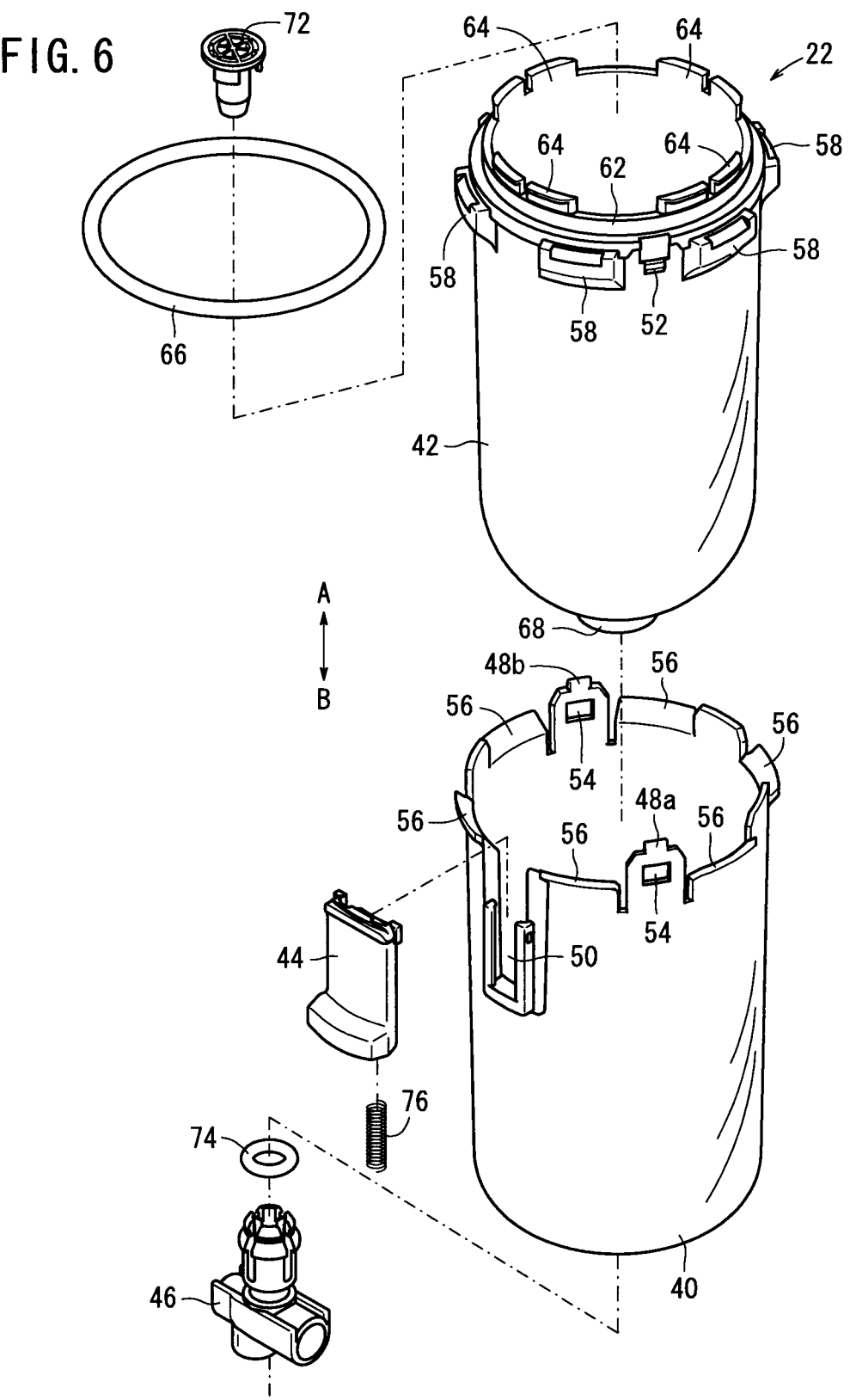
FIG. 6 is an exploded perspective view of a case unit that constitutes part of the filter apparatus of FIG. 5.
Figure 7:
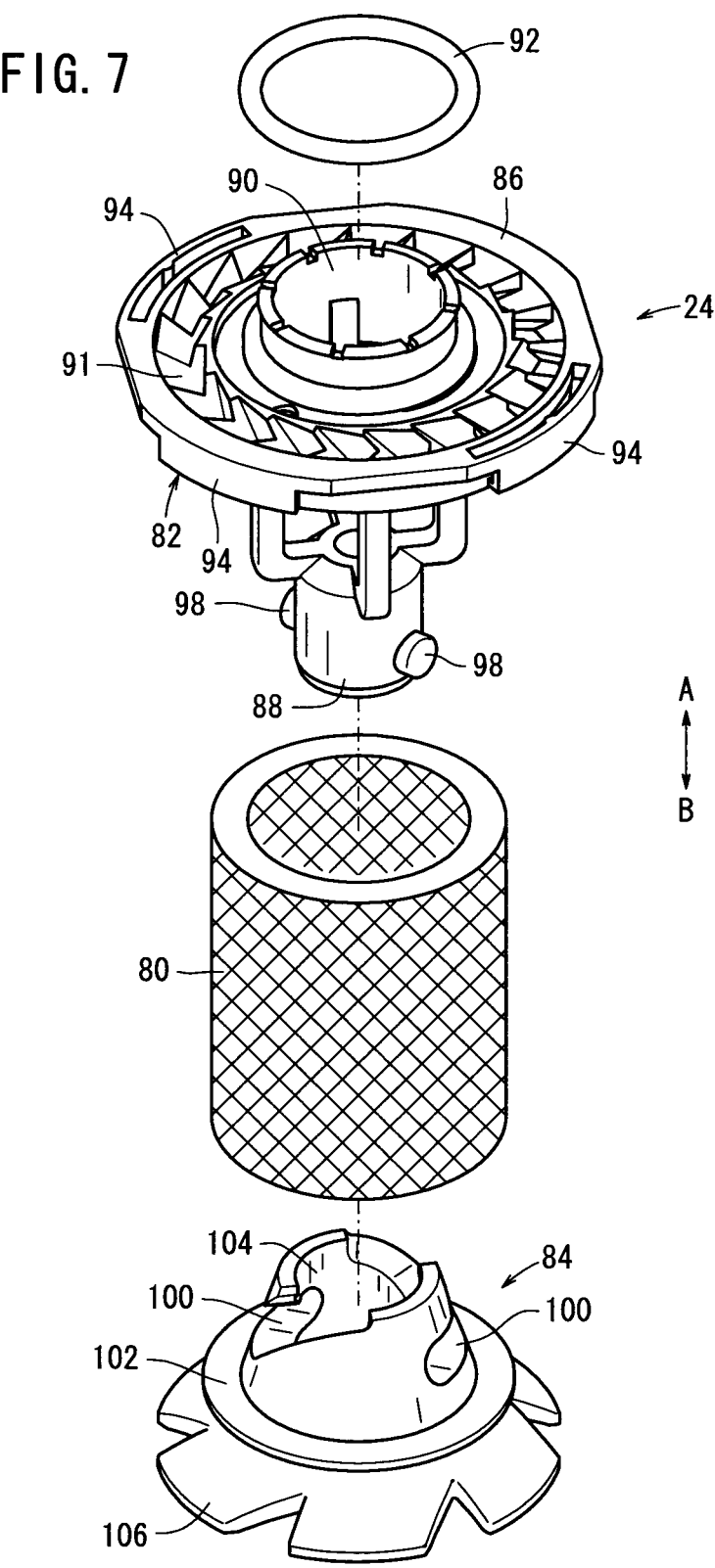
FIG. 7 is an exploded perspective view of a filter unit that constitutes part of the filter apparatus of FIG. 6.

Next, from the condition shown in FIG. 5, the filter unit 24 is inserted into the interior of the case unit 22 such that the main body 86 of the deflector 82 is positioned upwardly, and the hooks 64 of the inner case 42 are arranged at positions between the guide walls 94 of the main body 86. In addition, by rotating the filter unit 24 a predetermined angle about its axis with respect to the case unit 22, the hooks 64 are made to confront the guide walls 94 and are moved to positions on inner circumferential sides of the guide walls 94. More specifically, the plural hooks 64 are placed in a state of being covered respectively by the guide walls 94.

Consequently, the upper ends of the hooks 64 are placed in an overlapping state in a radial direction with lower ends of the guide walls 94, whereby displacement in the axial direction (the direction of arrows A and B) between the inner case 42 and the filter unit 24 including the deflector 82 is regulated. As a result, the filter unit 24 is connected together mutually with the case unit 22, with the filter unit 24 being accommodated inside the case unit 22.

Lastly, with the opening thereof being oriented upwardly, the case unit 22 in which the filter unit 24 is assembled is inserted into the installation hole 36 of the first body 20, and the case unit 22 is rotated a predetermined angle about its axis with respect to the first body 20. As a result, the projections 58 and the retaining walls 56 are overlapped in the axial direction (the direction of arrows A and B) with the support members 38, and the projections 58 and the retaining walls 56 are made to engage with the support members 38. At this time, the retaining walls 56, which are in abutment against lower portions of the projections 58, also come into abutment against the support members 38.

Further, at the same time, as shown in FIG. 8A, the release button 44 is moved upwardly (in the direction of the arrow A) by the elastic force of the spring 76 and is inserted into the recess 78 of the installation hole 36. Owing thereto, in a state of being inserted into the installation hole 36 of the first body 20, the case unit 22 is retained by the support members 38 and is prevented from falling out downwardly (in the direction of the arrow B), together with movement of the case unit 22 in a rotational direction (i.e., in the direction of the arrow C in FIG. 3) being regulated by the release button 44. More specifically, because rotation of the case unit 22 with respect to the first body 20 is regulated by the release button 44, the state of engagement with the support members 38 cannot be released.

Owing thereto, the case unit 22 in which the filter unit 24 is accommodated is placed in a state of being connected to the lower portion of the first body 20, whereby assembly of the filter apparatus 12 is completed (see FIG. 4). At this time, as shown in FIG. 4, the first communication passage 30 and the fins 91 of the deflector 82 confront and communicate with each other, and the second communication passage 32 communicates with the through hole 90. Further, the first sealing ring 66 abuts against the inner circumferential surface of the installation hole 36, and the third sealing ring 92 abuts against the inner circumferential surface of the second communication passage 32.

As shown in FIG. 8B, if the case unit 22 is to be taken out from the first body 20, the release button 44 is pressed downward against the elastic force of the spring 76, whereby the release button 44 becomes disengaged from the recess 78. Owing thereto, the condition under which rotational displacement of the case unit is prevented becomes released. Thereafter, if the case unit 22 is rotated by a predetermined angle, after the projections 58 and the retaining walls 56 have been released from engagement with the support members 38, the case unit 22 is moved in a direction (the direction of the arrow B) so as to separate away from the first body 20.

Next, explanations shall be made concerning operations and advantageous effects of the fluid pressure unit 10 including the filter apparatus 12, which is assembled in the foregoing manner. It shall be assumed that unillustrated tubes are connected beforehand to the first port 26 of the filter apparatus 12 and the fourth port 124 of the lubricator 16.

First, the pressure fluid is supplied through a tube from a non-illustrated pressure fluid supply source to the first port 26 of the filter apparatus 12. After the pressure fluid has flowed to the first communication passage 30 from the first port 26 of the filter apparatus 12, the pressure fluid is guided to the interior of the inner case 42 by passing through and between the fins 91 of the deflector 82. At this time, by passing through the plural fins 91, the pressure fluid is guided to the interior of the inner case 42 while being rotated in a circumferential direction about the axis of the inner case 42. Owing thereto, due to centrifugal force caused by such rotation, moisture and the like contained within the pressure fluid is separated radially outwardly and moves toward the inner circumferential side of the inner case 42.

Further, such separated moisture and the like, after having moved downwardly (in the direction of the arrow B) along the inner circumferential wall of the inner case 42, collects in the bottom portion of the inner case 42 and is drained therefrom. By opening of the drain cock 46, moisture and the like to be drained can be discharged to the exterior of the inner case 42.

On the other hand, as a result of the pressure fluid from which moisture and the like has been separated by passing from the outer circumferential side of the filter element 80 and toward the inner circumferential side, dust, particulates and the like contained within the pressure fluid are removed. Thereafter, the pressure fluid, after having risen inside the filter element 80 and been guided via the through hole 90 to the second communication passage 32, is discharged as clean pressure fluid from the second port 28.

In the filter apparatus 12, because the outer case 40 and the inner case 42 that constitute the case unit 22 are made from a transparent resin material, which is light-permeable, the amount of moisture to be drained, which is collected inside the filter apparatus 12, and the dust and the like adhered to the filter element 80 can easily be confirmed from the exterior of the filter apparatus 12.

The pressure fluid, from which moisture, dust and the like has been removed by the filter apparatus 12, is supplied from the second port 28 of the filter apparatus 12 to the port (not shown) of the regulator 14, which is connected integrally with the filter apparatus 12 by the connector 18*a*. After having been adjusted to a preset pressure value by the handle 110, the adjusted pressure fluid is supplied via the other port thereof to the lubricator 16, which is connected integrally with the regulator 14 by the connector 18*b*.

Simultaneously with the adjusted pressure fluid being supplied from the third port 122 of the lubricator 16 and flowing to the side of the fourth port 124 through the third and fourth communication passages 126, 148, a portion of the pressure fluid passes through the branch passage 134 that communicates with the third port 122 and is supplied to the interior of the inner case 138. At this time, by means of the damper 150, compared to the pressure fluid flowing directly to the fourth port 124 from the third port 122, the pressure of the pressure fluid, which passes through the branch passage 134 and is guided to the interior of the inner case 138, is made higher.

Owing thereto, the lubricating oil is pressed by the pressure fluid supplied to the interior of the inner case 138, and after passing through the oil guide tube 160 and flowing to the side of the holder 120 (in the direction of the arrow A), the lubricating oil passes through the oil passage 154 and is supplied into the reservoir 152. The oil then passes through the drip opening 156 and is dripped into the fourth communication passage 148. Consequently, if the pressure fluid passes through the interior of the fourth communication passage 148, a predetermined amount of lubricating oil is mixed with the pressure fluid, and thereafter, the pressure fluid is supplied from the fourth port 124 and through a tube to other fluid pressure devices for which lubrication is needed.

Because the outer case 136 and the inner case 138 that constitute the case unit 116 are made from a transparent resin material, which is light-permeable, the amount of lubricating oil filled in the interior of the lubricator 16 can easily be confirmed from the exterior.

In the foregoing manner, according to the first embodiment, the plural guide walls 94 are provided on the deflector 82 of the filter apparatus 12, such that after the filter unit 24 including the deflector 82 has been inserted into the interior of the case unit 22, and the hooks 64 of the inner case 42 have been arranged at positions between the guide walls 94 of the main body 86, by rotating the filter unit 24 through a predetermined angle with respect to the case unit 22, the hooks 64 are moved to positions on the inner circumferential side of the guide walls 94, and a condition can be produced in which upper ends of the hooks 64 and lower ends of the guide walls 94 overlap one another in the radial direction.

More specifically, by engagement of the hooks 64 and the guide walls 94 in the axial direction (the direction of arrows A and B) of the case unit 22 and the filter unit 24, displacement of the inner case 42 and the filter unit 24 including the deflector 82 is regulated. Consequently, after the filter unit 24 has been accommodated inside the case unit 22, by relative rotational displacement therebetween, the filter unit 24 can be connected with respect to the case unit 22 easily and reliably.

Further, because a structure is provided in which the filter unit 24 is not accommodated in the first body 20, but rather, is accommodated in and connected to the case unit 22, which is connected to a lower part of the first body 20, merely by removing the case unit 22 from the first body 20, the filter unit 24 can simultaneously be removed therewith. Owing thereto, compared to the filter apparatus of the conventional technique in which a filter element is installed in the main body (first body), attachment and detachment operations are extremely simple. Further, with the present invention, even in the case that the filter apparatus is installed together with tubes (not shown) at a high location or a low location, by detaching and moving the case unit 22, it is unnecessary to carry out operations for exchanging or replacing the filter unit 24 at such high or low locations, and replacement operations can be performed easily.

Furthermore, when the filter unit 24 is assembled with respect to the first body 20, after the filter unit 24 has been accommodated in the case unit 22 beforehand, connection of the case unit 22 to the lower part of the first body 20 can be completed. Therefore, even if the first body 20 is installed together with tubes at a high location or a low location, assembly operations for the filter unit 24 can be carried out easily.

Still further, because the filter unit 24 is accommodated in the interior of the case unit 22, compared with the filter apparatus according to the conventional technique, when the case unit 22 and the filter unit 24 are attached to or detached from the first body 20, the movement amount by which the case unit 22 and the filter unit 24 are moved in the axial direction (the direction of arrows A and B) is small, and thus attachment and detachment operations are easy to perform, and are suited to being carried out in a narrow space or the like.

The case units 22, 116 that make up the filter apparatus 12 and the lubricator 16 are not limited to being formed from light-permeable transparent resin materials. For example, the case units 22, 116 may be formed from pressure resistant glass, or instead of transparent materials, may be formed from semi-transparent materials. More specifically, the outer cases 40, 136 and the inner cases 42, 138 constituting the case units 22, 116 may be made from any materials that are capable of withstanding the pressure applied thereto, and which enable the interior thereof to be confirmed visually from the exterior.

Figure 11:
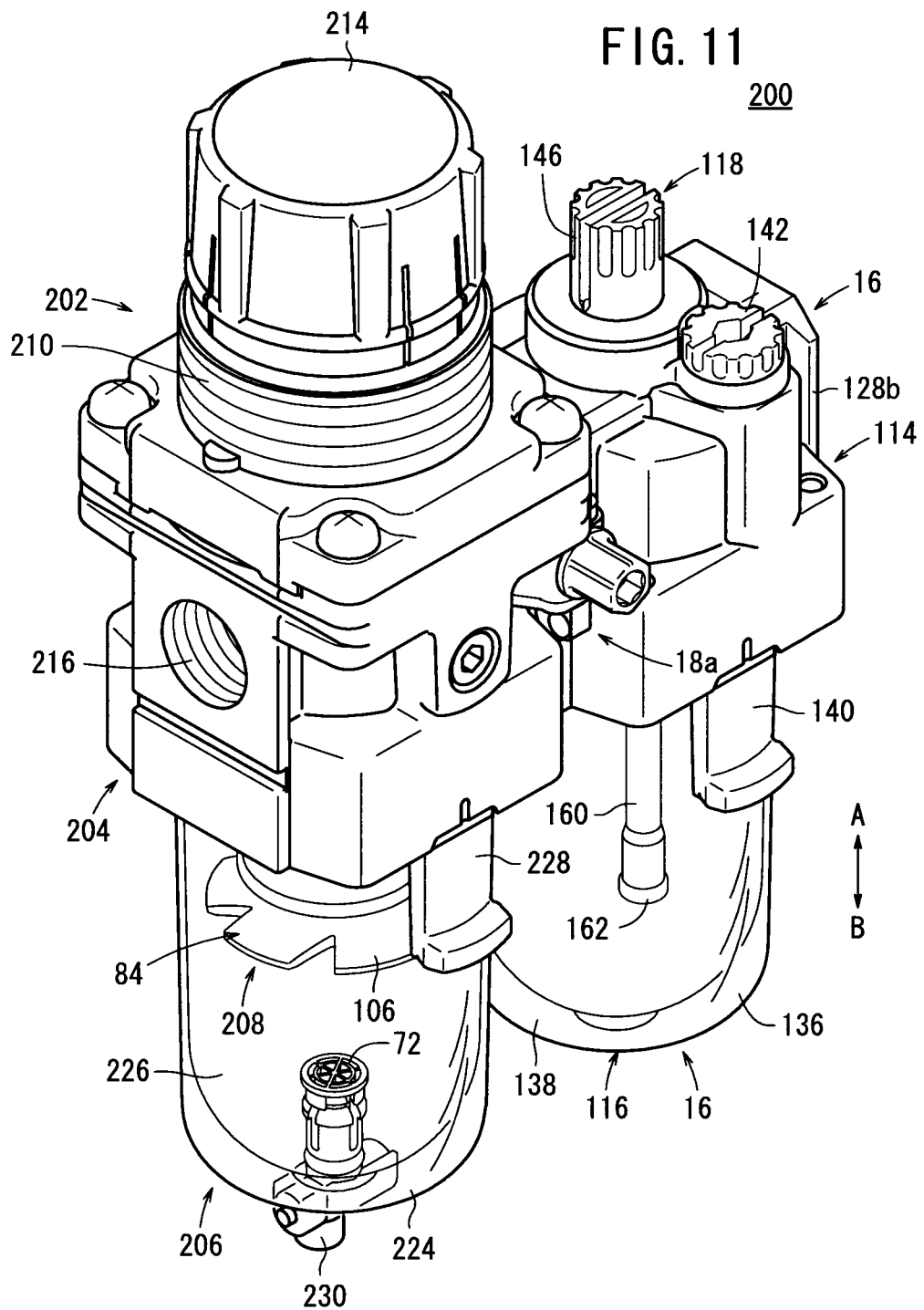
FIG. 11 is an exterior perspective view of a fluid pressure unit including a filter apparatus according to a second embodiment of the present invention.
Figure 12:
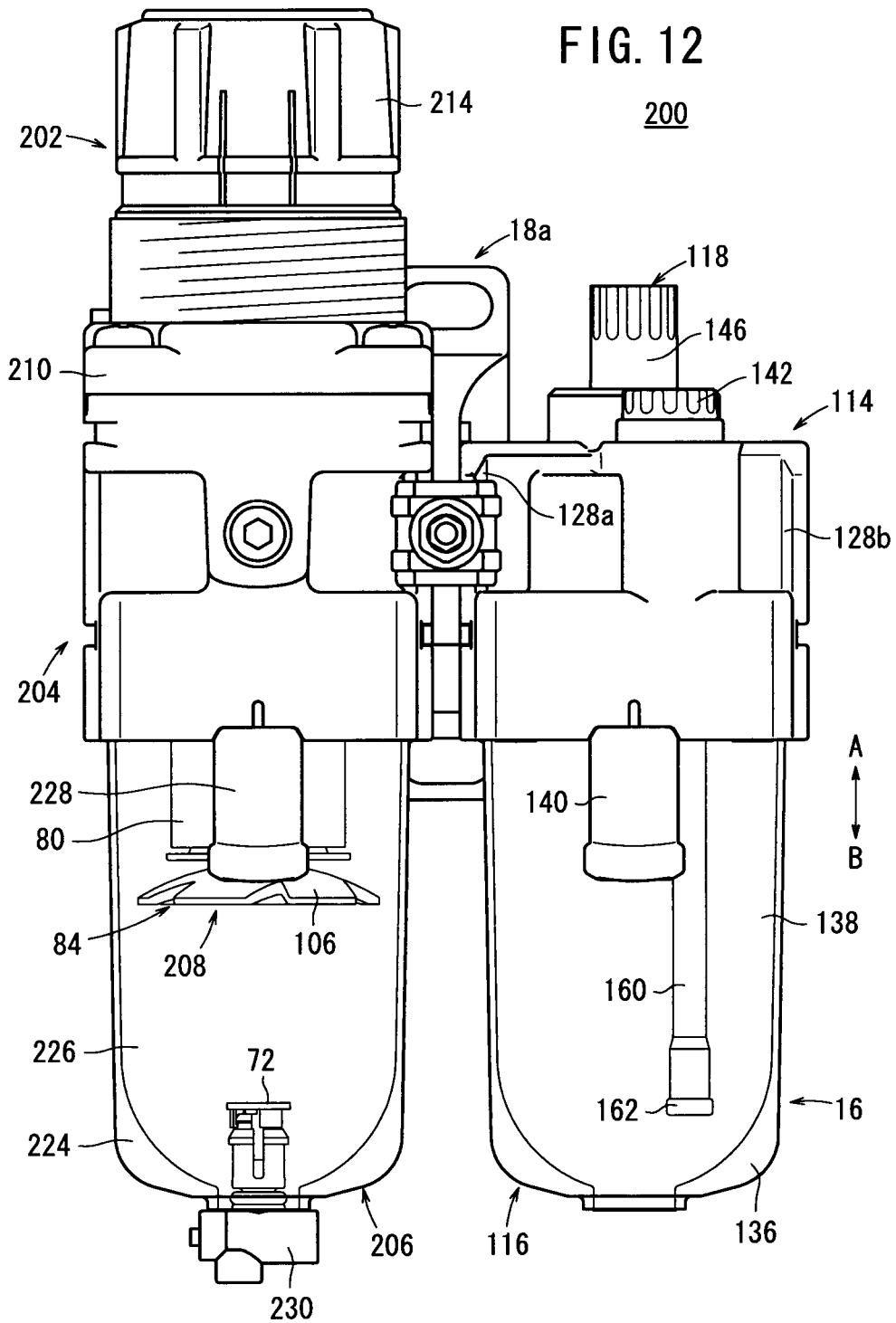
FIG. 12 is a front view of the fluid pressure unit shown in FIG. 11.
Figure 13:
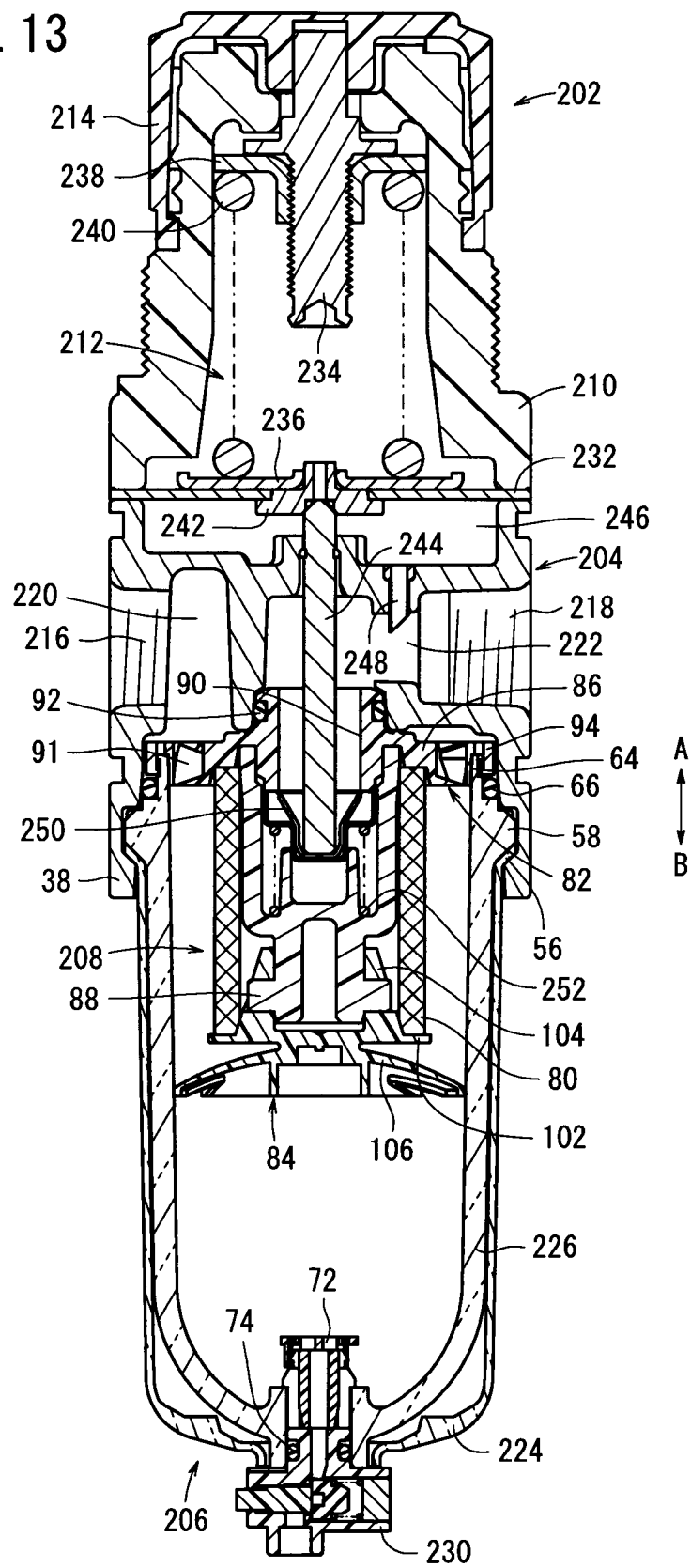
FIG. 13 is an overall cross sectional view of a filter-regulator that constitutes part of the fluid pressure unit of FIG. 12.

Next, a fluid pressure unit 200, including a filter apparatus according to a second embodiment, is shown in FIGS. 11 through 13. Constituent elements, which are the same as those of the fluid pressure unit 10 according to the aforementioned first embodiment, are designated by the same reference characters, and detailed explanations of such elements are omitted.

In the fluid pressure unit 200 according to the second embodiment, the fluid pressure devices thereof differ from the fluid pressure devices of the first embodiment, in that a filter-regulator 202 is provided in which a filter for removal of dust, particulates and the like contained in the pressure fluid, and a regulator for reducing the pressure of the pressure fluid are disposed together integrally.

As shown in FIGS. 11 through 13, the fluid pressure unit 200 is constituted from the filter-regulator 202, a lubricator 16 connected to the filter-regulator 202 for mixing a lubricating oil with respect to the pressure fluid, and a connector 18*a* by which the filter-regulator 202 and the lubricator 16 are mutually connected. The aforementioned filter-regulator 202 and the lubricator 16 function as fluid pressure devices to which a pressure fluid is supplied to interior portions thereof.

Concerning the lubricator 16, since the structure thereof is the same as that of the lubricator 16 in the fluid pressure unit 10 according to the above-described first embodiment, detailed explanations thereof are omitted.

The filter-regulator 202 includes a body 204, a case unit (case) 206 connected to a lower part of the body 204, a filter unit 208 installed in the interior of the case unit 206, a bonnet 210 connected to an upper part of the body 204, an adjustment mechanism 212 disposed in the interior of the bonnet 210, and a handle 214 disposed rotatably on an upper portion of the bonnet 210.

The body 204 comprises fifth and sixth ports 216, 218 through which the pressure fluid is supplied and discharged, a fifth communication passage 220 communicating with the fifth port 216, and a sixth communication passage 222 communicating with the sixth port 218.

The case unit 206 includes an outer case (first case portion) 224 formed as a bottomed cylinder, an inner case (second case portion) 226 that is inserted into an interior of the outer case 224, a release button 228 disposed for displacement with respect to the outer case 224, and a drain cock 230 disposed on bottom parts of the outer case 224 and the inner case 226.

The structure of the case unit 206 and the filter unit 208 is the same as in the filter apparatus 12 according to the above-described first embodiment, and therefore, detailed explanation of such features is omitted.

The bonnet 210 is formed in a cylindrical shaped and is connected to an upper part of the body 204, sandwiching a diaphragm 232 that makes up the adjustment mechanism 212. Further, the handle 214 is disposed rotatably through a rotary shaft 234 on an upper portion of the bonnet 210. A spring 240 is interposed via a spring holder 238 between the rotary shaft 234 and a disk member 236, which constitute parts of the adjustment mechanism 212.

In addition, by rotating the handle 214, the rotary shaft 234 is rotated integrally therewith, accompanied by the spring holder 238, which is screw-engaged with the rotary shaft 234, being displaced along the axial direction (in the direction of arrows A and B), whereby the spring 240 is compressed, for example, via the spring holder 238, and a pressing force from the spring 240 is applied to the diaphragm 232.

The adjustment mechanism 212 includes the diaphragm 232 in the form of a thin membrane having elasticity and interposed between the body 204 and the bonnet 210, a retaining member 242 that retains a center portion of the diaphragm 232, the spring holder 238, which is disposed upwardly of the retaining member 242 while the diaphragm 232 is disposed between the retaining member 242 and the spring holder 238, and a shaft 244 provided on a lower portion of the retaining member 242.

A diaphragm chamber 246 is formed on a lower portion of the diaphragm 232 between the diaphragm 232 and the body 204. The diaphragm chamber 246 communicates through a pilot passage 248 with the sixth communication passage 222.

Further, on a lower end of the shaft 244, a shaft holder 250, which is disposed between the main body 86 of the deflector 82 and the retaining member 88, abuts thereagainst, and a return spring 252 is interposed between the shaft holder 250 and the retaining member 88. By an elastic force of the return spring 252, the shaft 244 is urged upwardly (in the direction of the arrow A) via the shaft holder 250, whereas the upper end of the shaft 244 abuts against a center portion of the retaining member 242.

Next, explanations shall be made concerning operations and advantageous effects of the fluid pressure unit 200 according to the second embodiment. It is assumed that a desired pressure has been set beforehand by operating the handle 214.

First, the pressure fluid is supplied from a non-illustrated pressure fluid supply source to the fifth port 216 of the body 204. The pressure fluid flows to the interior of the inner case 226 by passing through the fifth communication passage 220, and is guided downward while undergoing rotation by passing between the fins 91 of the deflector 82. On this occasion, moisture and the like contained within the pressure fluid are suitably separated out due to centrifugal force caused by such rotation, and the pressure fluid moves toward the inner circumferential side of the inner case 226.

Further, the separated moisture, after moving downward along the inner circumferential surface of the inner case 226, collects as moisture to be drained in the bottom of the inner case 226. By opening the drain cock 230, the moisture to be drained can be discharged to the exterior of the inner case 226.

On the other hand, the pressure fluid, from which moisture and the like has been separated out, passes to the inner circumferential side from the outer circumferential side of the filter element 80, wherein dust, particulates and the like contained within the pressure fluid are suitably removed, and thereafter, the pressure fluid rises inside the filter element 80 and flows into the sixth communication passage 222. Because the outer case 224 and the inner case 226 that make up the case unit 206 are formed from a light-permeable transparent resin material, the moisture to be drained, which has collected in the interior thereof, as well as dust and the like, can be observed visually from the exterior.

Further, at the same time, due to a difference between a pressing force applied to the diaphragm 232 from the spring 240 and the pressure acting on the diaphragm 232 from the pressure fluid inside the diaphragm chamber 246, the shaft 244 is displaced in the axial direction (the direction of arrows A and B), whereby the pressure fluid is adjusted to a desired pressure. In addition, after moisture and dust, etc., have been removed therefrom, and after being adjusted to a predetermined pressure, the pressure fluid is supplied through the sixth port 218 to the adjacent lubricator 16.

The pressure fluid supplied to the lubricator 16, after a predetermined amount of lubricating oil has been dripped and mixed therewith in the interior of the lubricator 16, is supplied to other fluid pressure devices for which lubrication is required.

In the foregoing manner, according to the second embodiment, plural guide walls 94 are provided on the deflector 82 that makes up the filter unit 208 of the filter-regulator 202, such that after the filter unit 208 including the deflector 82 has been inserted into the interior of the case unit 206, and the hooks 64 of the inner case 226 have been arranged at positions between the guide walls 94 of the main body 86, by a simple operation of rotating the filter unit 208 through a predetermined angle with respect to the case unit 206, upper ends of the hooks 64 and lower ends of the guide walls 94 are made to overlap one another in the radial direction, and together therewith, the guide walls 94 and the hooks 64 can be engaged in the axial direction (the direction of arrows A and B) of the case unit 206 and the filter unit 208. As a result, displacement in the axial direction of the case unit 206 and the filter unit 208 including the deflector 82 is regulated, and the filter unit 208 can be connected reliably in a state of being accommodated in the interior of the case unit 206.

Further, because a structure is provided in which the filter unit 208 is not accommodated in the body 204, but rather, is accommodated in and connected to the case unit 206, which is connected to a lower part of the body 204, merely by removing the case unit 206 from the body 204, the filter unit 208 can simultaneously be removed therewith. Owing thereto, compared to the filter apparatus of the conventional technique in which a filter element is installed in the main body (first body), attachment and detachment operations are extremely simple. Further, with the present invention, even in the case that the body 204 is installed together with tubes (not shown) at a high location or a low location, by detaching and moving the case unit 206, it is unnecessary to carry out operations for exchanging or replacing the filter unit 208 at such high or low locations, and replacement operations can be performed easily.

Furthermore, when the filter unit 208 is assembled with respect to the body 204, after the filter unit 208 has been accommodated in the case unit 206 beforehand, connection of the case unit 206 to the lower part of the body 204 can be completed. Therefore, even if the body 204 is installed together with tubes at a high location or a low location, assembly operations for the filter unit 208 can be carried out easily.

Still further, because the filter unit 208 is accommodated in the interior of the case unit 206, compared with the filter apparatus according to the conventional technique, when the case unit 206 and the filter unit 208 are attached to or detached from the body 204, the movement amount by which the case unit 206 and the filter unit 208 are moved in the axial direction (the direction of arrows A and B) is small, and thus attachment and detachment operations are easy to perform, and are suited to being carried out in a narrow space or the like.

The filter apparatus according to the present invention is not limited to the above-described embodiments, and it is a matter of course that various additional or modified structures could be adopted therein without departing from the essence of the invention as set forth in the appended claims.

The invention claimed is:

1. A filter apparatus comprising:
   a body having ports through which a pressure fluid is supplied and discharged;
   a case in a shape of a bottomed cylinder, which is attachable and detachable with respect to the body, and wherein an interior of the case communicates with the ports;
   a filter unit accommodated in the interior of the case, the filter unit having a filter element for removing dust, particulates and the like contained within the pressure fluid, and a holder for retaining the filter element; and
   a connecting mechanism for connecting the case and the filter unit, wherein the connecting mechanism permits limited mutual relative displacement in an axial direction between the case and the filter unit,
   wherein the connecting mechanism comprises:
   a plurality of guide walls extending axially from the holder at respectively mutually separated positions in a circumferential direction, each of the guide walls extending in the axial direction and having an end terminating in a radially extending portion extending radially inward toward the case; and
   a plurality of hooks provided on the case at respectively mutually separated positions in a circumferential direction, the hooks extending radially outward toward the guide walls, wherein the radially extending portions of the guide walls and the hooks overlap one another in the radial direction,
   wherein the hooks are configured to fit circumferentially between the guide walls, wherein the hooks can be positioned radially inside the guide walls by fitting the hooks circumferentially between the guide walls and relatively rotating the case and filter unit so that the hooks confront the guide walls and the radially overlapping extending portions and hooks limit mutual relative displacement in the axial direction between the case and the filter unit.

2. The filter apparatus according to claim 1, wherein the holder comprises:
   a disk-shaped main body; and
   a retaining member formed on an end of the main body, and which is capable of retaining the filter element therein,
   wherein the guide walls are disposed on an outer circumferential portion of the main body.

3. The filter apparatus according to claim 2, wherein the main body is disposed so as to cover the open end of the case.

4. The filter apparatus according to claim 1, wherein the case is transparent to enable visual confirmation of the interior thereof, and includes a first case portion and a second case portion disposed in an interior of the first case portion, the hooks being disposed on the second case portion.

* * * * *